United States Patent
Berry et al.

(10) Patent No.: US 11,748,734 B2
(45) Date of Patent: Sep. 5, 2023

(54) PROGRAMMED SERVERS WITH ASSOCIATED DATA STRUCTURES TO TRACK AND MANAGE USER-RELATED ACTIVITY DATA

(71) Applicant: American Express Travel Related Services Co., Inc., New York, NY (US)

(72) Inventors: James N. Berry, Brooklyn, NY (US); Jeffrey A. Chwast, Long Beach, NY (US); Arvind Dua, Peoria, AZ (US); Philip B. Hayden, Westfield, NJ (US); Jahanzeb Jabbar, Rahway, NY (US); Sireesh B. Kilaru, Phoenix, AZ (US); Michael L. Sanabria, New York, NY (US)

(73) Assignee: American Express Travel Related Services Co., Inc., New York, NY (US)

( * ) Notice: Subject to any disclaimer, the term of this patent is extended or adjusted under 35 U.S.C. 154(b) by 0 days.

(21) Appl. No.: 16/592,172

(22) Filed: Oct. 3, 2019

(65) Prior Publication Data
US 2020/0387879 A1    Dec. 10, 2020

Related U.S. Application Data

(63) Continuation of application No. 15/715,920, filed on Sep. 26, 2017, now abandoned.

(51) Int. Cl.
*G06Q 20/32* (2012.01)
*G06Q 20/38* (2012.01)
(Continued)

(52) U.S. Cl.
CPC ............. *G06Q 20/24* (2013.01); *G06Q 20/14* (2013.01); *G06Q 40/03* (2023.01); *G06F 3/0482* (2013.01)

(58) Field of Classification Search
CPC ........ G06Q 20/14; G06Q 20/24; G06Q 40/02; G06Q 40/025; G06Q 40/00; G06F 3/0482;
(Continued)

(56) References Cited

U.S. PATENT DOCUMENTS 5,797,133 A * 8/1998 Jones ..................... G06Q 40/08
                                                                  705/38
7,606,764 B1 * 10/2009 Mancini ............... G06Q 20/204
                                                                  705/17
(Continued)

FOREIGN PATENT DOCUMENTS

CA        2781183 A1 *  5/2011   ............. G06Q 20/40
JP     1995262455         10/1995
(Continued)

OTHER PUBLICATIONS

Claire Tsosie, "Pay It Plan It: What to Know About AmEx's New Feature," Aug. 29, 2017, NerdWallet blog, retrieved from website https://www.nerdwallet.com/blog/credit-cards/pay-it-plan-it-amex-new-feature/ (Year: 2017).*

(Continued)

*Primary Examiner* — Daniel S Felten
*Assistant Examiner* — Douglas W Pinsky
(74) *Attorney, Agent, or Firm* — Thomas | Horstemeyer, LLP

(57) ABSTRACT

At least some embodiments of the present disclosure are directed to an exemplary system including an application server; a cache memory storage; and a datastore; where the application server is at least configured to: receive, from one or more web client sessions, real-time user-related activity data that is representative of one or more activities performed by a user during a day; store the real-time user-related activity data in a temporary cache user profile data
(Continued)

structure of the at least one cache memory storage; upon the receipt of the real-time user-related activity data, invoke, in real-time, a plurality of APIs that are configured to determine a user-specific eligibility data, generate a fixed activity plan; and attribute, in real-time, an activity performance to the fixed activity plan based on a pre-determined allocating rule.

20 Claims, 5 Drawing Sheets

(51) Int. Cl.
| | | |
|---|---|---|
| H04L 29/06 | (2006.01) | |
| G06Q 20/10 | (2012.01) | |
| G06F 16/23 | (2019.01) | |
| G06Q 40/06 | (2012.01) | |
| G06Q 20/40 | (2012.01) | |
| G06Q 20/36 | (2012.01) | |
| H04W 12/06 | (2021.01) | |
| H04W 12/08 | (2021.01) | |
| G06Q 20/24 | (2012.01) | |
| G06Q 20/14 | (2012.01) | |
| G06Q 40/03 | (2023.01) | |
| H04W 4/14 | (2009.01) | |
| G06F 21/45 | (2013.01) | |
| G06F 21/31 | (2013.01) | |
| G06Q 40/02 | (2023.01) | |
| H04W 12/062 | (2021.01) | |
| H04W 12/72 | (2021.01) | |
| G06F 21/32 | (2013.01) | |
| H04W 60/00 | (2009.01) | |
| G06Q 20/34 | (2012.01) | |
| G06F 3/0482 | (2013.01) | |

(58) Field of Classification Search
CPC ...... G06F 12/00; G06F 12/02; G06F 12/0223; G06F 12/023; G06F 12/0804; G06F 2212/7203; G06F 16/2282; G06F 16/00; G06F 16/20; G06F 16/22
See application file for complete search history.

(56) References Cited

U.S. PATENT DOCUMENTS

| | | | | |
|---|---|---|---|---|
| 7,870,048 B2 * | 1/2011 | Bhagwat | ............... | G06Q 40/04 705/37 |
| 8,036,987 B1 | 10/2011 | Grbac et al. | | |
| 8,078,528 B1 * | 12/2011 | Vicente | .................. | G06Q 40/02 705/38 |
| 2002/0063153 A1 * | 5/2002 | Stack | ..................... | G07F 7/1008 235/380 |
| 2002/0161699 A1 * | 10/2002 | Okamoto | ............... | G06Q 40/03 705/38 |
| 2003/0167226 A1 * | 9/2003 | Britton | ................... | G06Q 20/00 705/38 |
| 2007/0094134 A1 * | 4/2007 | Kalra | ..................... | G06Q 40/12 705/40 |
| 2010/0094735 A1 * | 4/2010 | Reynolds | ............... | G06Q 40/02 705/40 |
| 2012/0166311 A1 | 6/2012 | Dwight et al. | | |
| 2013/0297486 A1 * | 11/2013 | Colborn | ................. | G06Q 40/02 705/38 |
| 2014/0019286 A1 | 1/2014 | Fannin et al. | | |
| 2014/0180810 A1 * | 6/2014 | Boal | .................... | G06Q 20/209 705/14.53 |
| 2015/0073975 A1 * | 3/2015 | Bornhofen | ............. | G06Q 20/26 705/38 |

FOREIGN PATENT DOCUMENTS

| | | |
|---|---|---|
| JP | 2003-308466 | 10/2003 |
| JP | 2012123769 A | 6/2012 |
| KR | 20130135890 A | 12/2013 |
| KR | 20150065834 A | 6/2015 |
| KR | 101699536 B1 | 1/2017 |
| WO | 2014053920 A1 | 4/2014 |

OTHER PUBLICATIONS

American Express, "Pay It Plan It Frequently Asked Questions," 2017, retrieved from website https://web.archive.org/web/20171005075624/https://www.americanexpress.com/us/credit-cards/features-benefits/plan-it/faq/index.html (Year: 2017).*
Erin El Issa, "Dealing with Credit Card Debt: How to Get Debt-Free," Aug. 28, 2013, Nerdwallet, retrieved from website https://www.nerdwallet.com/blog/credit-cards/credit-card-debt/(Year: 2013).*
G. Pascal Zachary, Showstopper!: The Breakneck Race to Create Windows NT and the Next Generation at Microsoft, 2014, Open Road Media (Year: 2014).*
Author not known, "Distributed File Systems," Jan. 13, 2019, retrieved from website https://web.archive.org/web/20190113203405/http://www.unf.edu:80/~sahuja/cis6302/filesystems.html (Year: 2019).*
Ohio Supercomputer Center, "Available File Systems," Sep. 6, 2015, retrieved from website https://web.archive.org/web/20150906065257/https://www.osc.edu/supercomputing/storage-environment-at-osc/available-file-systems (Year: 2015).*
Jeff Tyson, "How Computer Memory Works," Jun. 27, 2019, retrieved from website https://web.archive.org/web/20190627192943/https://computer.howstuffworks.com/computer-memory1.htm (Year: 2019).*
Talend, "Beginner's Guide to Batch Processing," Mar. 14, 2019, retrieved from website https://www.talend.com/resources/batch-processing/ (Year: 2019).*
Amazon, "Monthly Payments Terms & Conditions," Jul. 4, 2017, retrieved from: https://web.archive.org/web/20170704182203/https://www.amazon.com/gp/help/customer/display.html?nodeId=202095050 (Year: 2017).*
Glare Tsosie, "Play It Plan It: What to Know About AmEx's New Feature," Aug. 29, 2017, NerdWallet blog, retrieved from website https://nerdwallet.com/blog/credit-cards/pay-it-plan-it-amex-new-feature/ (Year: 2017).
American Express, "Pay It Plan It Frequently Aske Questions," 2017, retrieved from website https://web.archive.org/web/20171005075624/https://www.americanexpress.com/us/credit-cards/features-benefits/plan-it/faq/index.html (Year: 2017).
Search Report in Application No. 18861684.1-1213/3688567 PCT/US/2018047563 dated Jul. 9, 2021.
Business Wire, a Berkshire Hathaway company, American Express Introduce Pay It Plan It: A Mobile Feature that Gives Card Members Two New Ways to Pay for Credit Card Purchases, [online], U.S.A., Business Wire, a Berkshire Hathaway company, Aug. 30, 2017, [searched on Dec. 9, 2021], https://www.businesswire.com/news/home/20170830005740/en/American-Express-Introduces-Pay-It-Plan-It%E2%84%A0-A-Mobile-Feature-That-Gives-Card-Members-Two-New-Ways-to-Pay-for-Credit-Card-Purchases.

* cited by examiner

US 11,748,734 B2

PROGRAMMED SERVERS WITH ASSOCIATED DATA STRUCTURES TO TRACK AND MANAGE USER-RELATED ACTIVITY DATA

FIELD

The present disclosure relates to data management, and more specifically, to segmenting multiple repayment schemes.

BACKGROUND

Consumers may become overwhelmed by transaction account bills. Consumers typically have the perception that it takes a very long time to pay off a purchase which was completed months ago, or even years ago. Additionally, a consumer may be hesitant to complete a large purchase using a transaction account with a monthly annual percentage rate ("APR"), if the consumer does not have a specific plan for paying off the transaction amount.

SUMMARY

A system, method, and computer readable medium (collectively, "system") for segmenting multiple repayment schemes are disclosed. The system may perform steps including: performing a batch processing event; storing batch processed data from the batch processing event in a datastore; storing a real time event in a cache; determining, based on the batch processed data and the real time event, that a consumer is eligible for a fixed fee payment plan; presenting a list of transactions for a transaction account of the consumer in a graphical user interface; receiving first input comprising a selection of a first transaction; and creating, in response to the first input, a fixed fee payment plan including the first transaction.

In various embodiments, the system may present a plurality of durations for the fixed fee payment plan. The system may receive second input comprising a selection of a second transaction, wherein the fixed fee payment plan includes the second transaction in addition to the first transaction. The system may remove the first transaction and the second transaction from a revolving APR balance of the transaction account The system may estimate an APR total cost of borrowing for the fixed fee payment plan; calculate, based on the estimating the APR total cost of borrowing, a fixed finance charge rate; calculate, based on the fixed finance charge rate, a fixed finance charge amount; and present the fixed finance charge amount in the graphical user interface. The system may calculate a monthly fixed fee minimum amount due, wherein the monthly fixed fee minimum amount due comprises: an amount of the fixed fee payment plan divided by a number of months of the fixed fee payment plan, plus the fixed finance charge amount. The system may calculate a minimum amount due for the transaction account based on a revolving APR minimum amount due and a fixed fee minimum amount due; and present the minimum amount due for the transaction account in the graphical user interface. The system may calculate a fixed fee minimum amount due; receive a payment to the transaction account, wherein the payment is equal to or greater than a sum of a revolving APR balance and the fixed fee minimum amount due; revolve a remaining balance of the transaction account without charging an APR finance charge to the transaction account; charge a fixed fee finance charge on a subsequent statement period; and exempt a new transaction from the APR finance charge.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A system for line item payment scheduling is disclosed. A consumer may access a transaction account statement online. The transaction account statement may provide a total balance, total amount due, and a list of all (or any subset of) transactions completed during a given billing period. As used herein, the individual transaction may include any purchase, loan (e.g., student loan), activity, event, experience, or any portion thereof. The individual transaction may be part of a displayed list of transactions or the individual transaction may sequentially, periodically, or randomly be provided for review or analysis. The consumer may have the opportunity to place an individual transaction in a fixed fee payment plan (and separate from the revolving APR balance) by selecting an individual transaction displayed in the list of transactions. The system may utilize a combination of batch and real-time processing to determine eligibility and to present fixed fee payment options to the consumer. As used herein, a "revolving APR balance" is an amount that is subject to an annual percentage rate interest or finance charge. Although the fixed fee payment plan may revolve from month to month, the balance of the fixed fee payment plan is not charged any APR, but rather is charged a flat fee finance charge each month.

Figure 1:
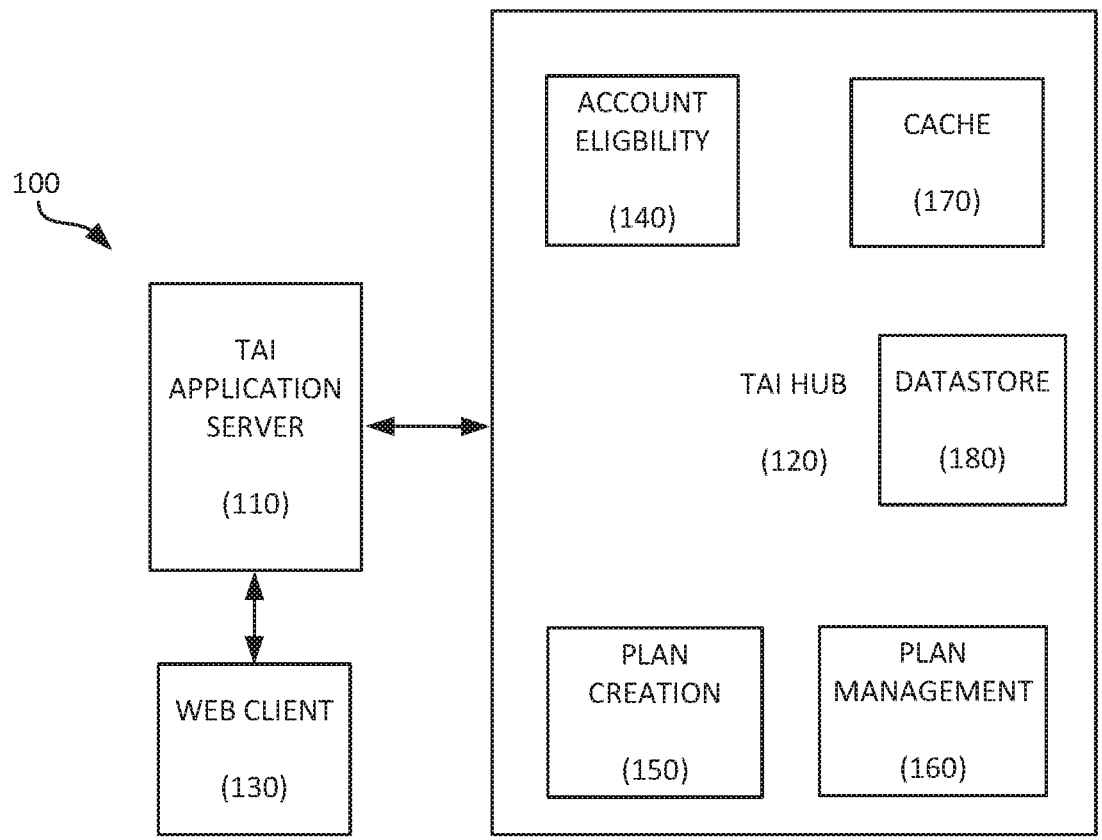
FIG. 1 illustrates various system components of a system for line item payment segmentation, in accordance with various embodiments.

Referring to FIG. 1, a system 100 for line item payment segmentation is illustrated according to various embodiments. The system 100 may comprise a transaction account issuer ("TAI") application server 110. The application server 110 may provide graphical user interface ("GUI"), such as a web site or mobile application, which allows a consumer to interact with a TAI. For example, the TAI application server 110 may provide a website which allows a consumer to view account statements and make payments.

The system 100 may comprise a TAI hub 120. The TAI hub 120 may comprise one or more servers and/or databases, such as datastore 180, which store information relevant to a consumer, such as transaction history, account balances, credit scores, personal information, etc. The TAI application server 110 may communicate with the TAI hub 120 in order to provide account information to the consumer and process payments from the consumer.

In various embodiments, datastore 180 may be updated on a daily basis utilizing batch processing. For example, datastore 180 may update consumer data such as credit scores, default risk, debt capacity, spend capacity, account balances, etc. every night.

Real time data may be stored in cache 170 between the batch updates of datastore 180. For example, throughout a single day a consumer may make purchases, enter new fixed fee payment plans, incur new revolving charges subject to an APR, obtain new transaction accounts, cancel existing transaction accounts, etc. Each event relevant to a consumer may be stored in the cache 170.

A consumer may interact with the system 100 utilizing one or more web clients. The consumer may use a web client 130 to view statements, make payments, and otherwise perform transaction account functions. The web client 130 may interact with TAI application server 110 in order for the consumer to make payments to the transaction account. In various embodiments, the web client 130 may comprise a mobile application, and the user may open the mobile application to interface with the TAI application server 110. In various embodiments, the web client 130 may comprise a touch screen interface, such that consumers may interact with the GUI by contacting the touch screen interface.

The system 100 may present consumers with options for fixed fee payment plans. In various embodiments, the system 100 may present the fixed fee payment plan options in real time in response to a user opening or logging into an application or website, or calling the TAI on the phone. The TAI hub 120 may utilize one or more application programming interfaces (API) to create and manage fixed fee payment plans.

An account eligibility API 140 may determine whether an account is eligible for a fixed fee payment plan. For example, the account eligibility API 140 may obtain eligibility data from the datastore 180 based on the batch processed data stored in the datastore 180. The eligibility data may indicate whether the consumer is eligible for a fixed fee payment plan. The eligibility data may indicate a maximum monthly payment for the fixed fee payment plans for the consumer. For example, the eligibility data may indicate that the consumer is able to spend a maximum of $200 per month in fixed fee payment plans. In various embodiments, the system 100 may determine, either utilizing the account eligibility API 140 or a separate transaction eligibility API, that a transaction is eligible for a fixed fee payment plan. Thus, in addition to determining that the account is eligible for a fixed fee plan, the system may determine which transactions are eligible for a fixed fee plan.

The account eligibility API 140 may communicate with the cache 170 to obtain real time data for the consumer. For example, the cache 170 may have an event stored indicating that the consumer entered a fixed fee payment plan that day which includes a $50 per month payment. Thus, the consumer's eligibility may be decreased to a maximum of $150 per month in fixed fee payment plans ($200-$50=$150). Thus, any fixed fee payment plan or transaction which required a monthly payment of greater than $150 would not be available to the consumer.

It would take a large amount of time to fetch real time data for all of the batch data stored in the datastore 180. However, by utilizing the batch data in the datastore 180 in combination with the real time data in the cache 170, the system 100 is able to quickly present real time offers to the consumer with decreased processing requirements.

A plan creation API 150 may generate various fixed fee payment plans for the consumer. For each line item in the consumer's account which is eligible for a fixed fee payment plan, the plan creation API 150 may generate one or more fixed fee payment plans which comply with the eligibility determination by the account eligibility API 140. In various embodiments, the duration of the fixed fee payment plans may be customized for the specific consumer. For example, the plan creation API 150 may evaluate the consumer profile and default risk, and the plan creation API 150 may generate fixed fee payment plans which are tailored to the specific consumer.

If the consumer selects a fixed fee payment plan, a plan management API 160 may control repayment rules for the transaction account. The plan management API 160 may segment the fixed fee payment plan from any revolving APR balances, as further described herein. For example, in response to receiving a payment from the consumer, the plan management API 160 may route a first portion of the payment to cover the minimum amount due of the fixed fee payment plan, a second portion of the payment to cover a minimum amount due of the revolving APR balance, and the remainder of the payment to be applied to a remaining balance subject to the highest rate, followed by any remainder to be applied to a balance subject to lower interest rates, and followed by any remainder to appear as a credit amount on the revolving APR balance. If the consumer pays the full balance of the revolving APR balance, as well as the minimum amount due of the fixed fee payment plan by a monthly due date, the consumer will not be charged any APR finance charge on the remaining balance of the fixed fee payment plan, but rather will be charged the previously agreed upon fixed fee finance charge. Upon receipt of the aforementioned payment, the revolving APR balance will cease to revolve and will therefore stop accruing APR finances charges as of the date of the payment. Furthermore, any new APR transactions will be exempt from an APR finance charge as long as the consumer continues to make the aforementioned payment in subsequent statement periods.

Figure 2:
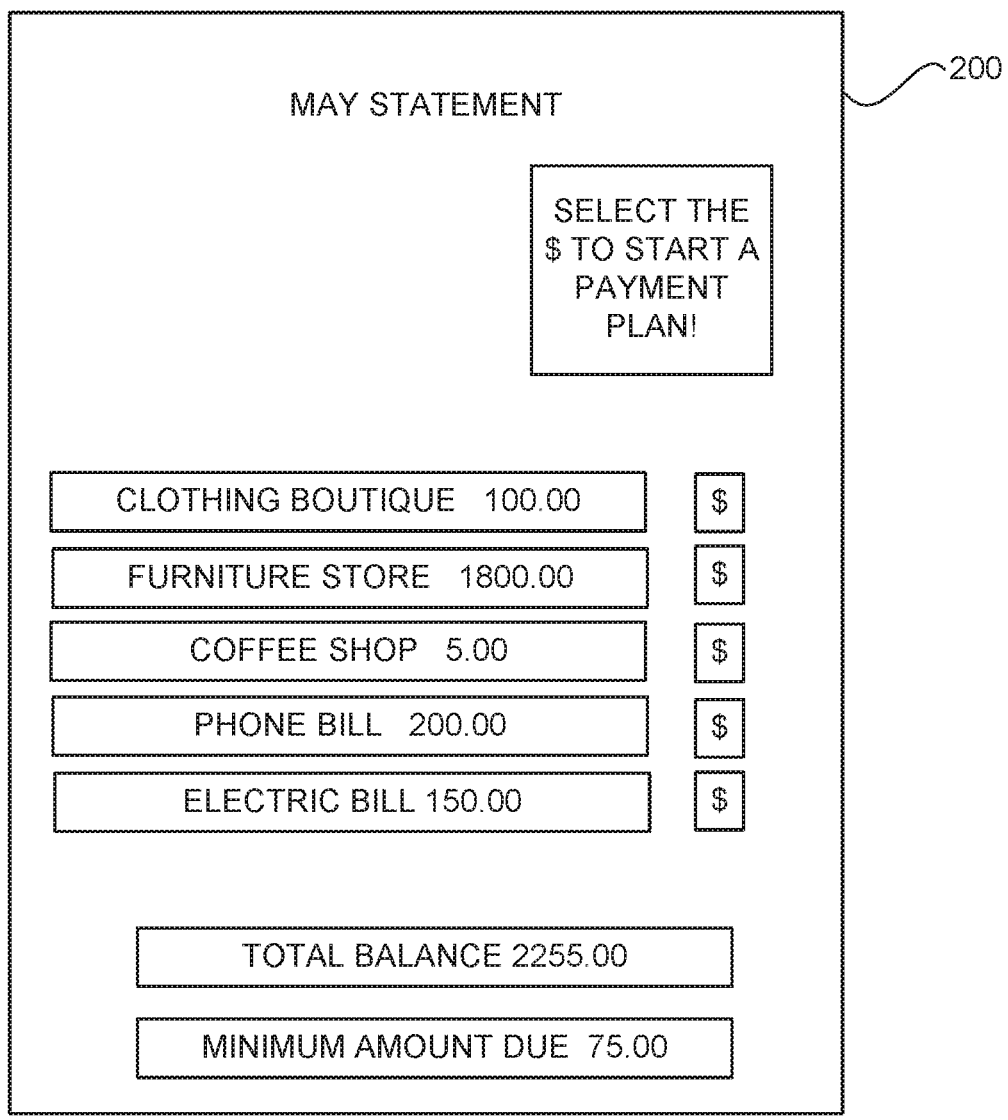
FIG. 2 illustrates a GUI for interfacing with a transaction account statement, in accordance with various embodiments.

Referring to FIG. 2, a GUI 200 for interfacing with a transaction account statement is illustrated according to various embodiments. The statement may be a summary of charges over a previous billing period. However, in various embodiments, the statement may display transactions for a current billing period, transactions in any designated billing period, transactions from different billing periods, related transactions, complementary transactions, unrelated transactions, periodic transactions, random transactions, predicted future transactions and/or the like. Each line item may provide some or all information for an individual transaction. In various embodiments, the information may comprise amount, date, time, merchant name, merchant location, item purchased, transaction reference number, and/or any other information relevant to the transaction.

In various embodiments, the GUI may provide an option for moving an individual transaction to a fixed fee payment plan. The system may determine eligibility for the consumer to move a transaction to a fixed fee payment plan. In various embodiments, the consumer may be limited to a certain number of fixed fee payment plans at a time, or a limited number per year. In various embodiments, the consumer may not be eligible for a fixed fee payment plan unless the consumer is in good standing on some or all accounts. In various embodiments, a button next to each individual transaction may allow the consumer to move the transaction to the fixed fee payment plan, and the transaction may be removed from the list of transactions from the revolving APR balance which is subject to the APR, and the transaction may be entered into a fixed fee payment plan.

Figure 3:
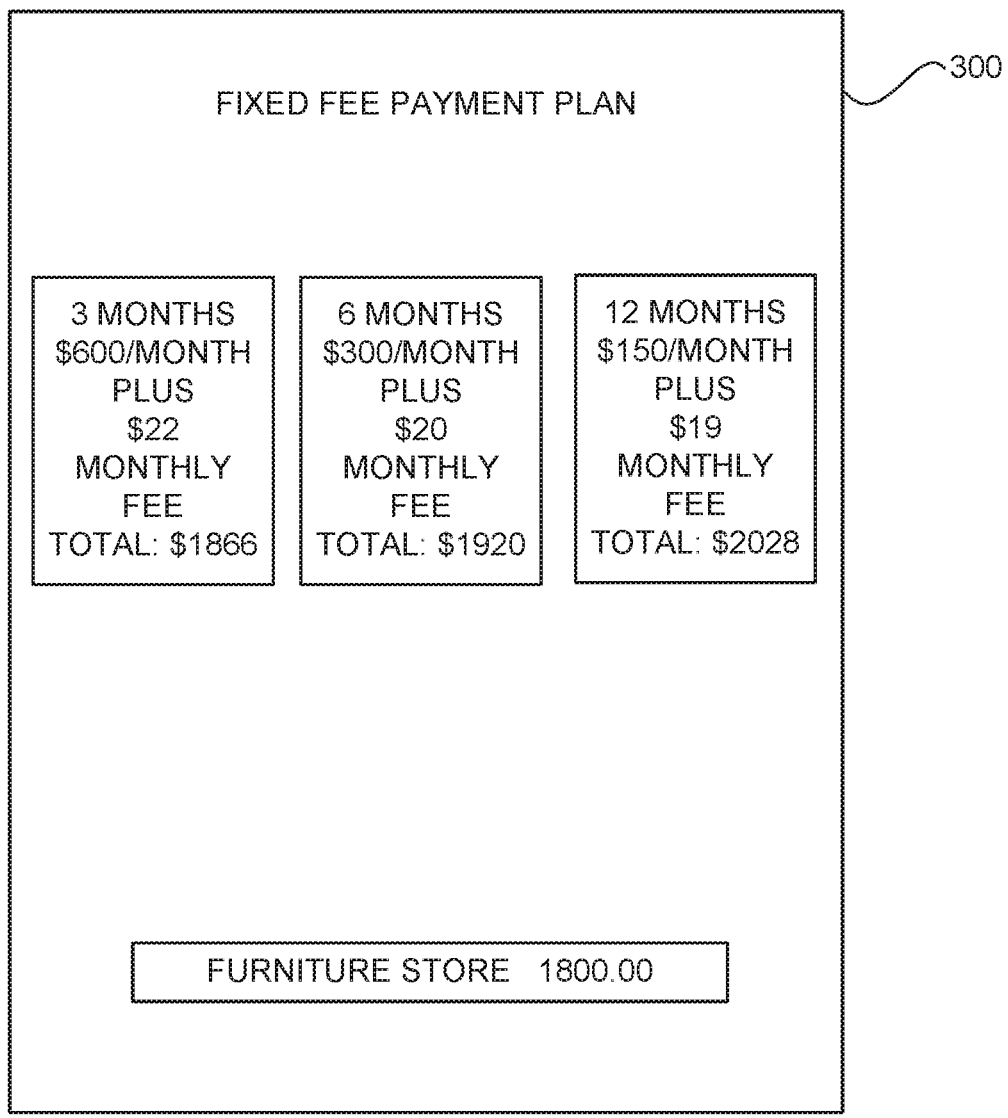
FIG. 3 illustrates an example screenshot of a GUI with multiple fixed fee payment plan options, in accordance with various embodiments.

Referring to FIG. 3, a screenshot 300 of a GUI with multiple fixed fee payment plan options is illustrated according to various embodiments. In response to the consumer selecting to move a transaction to a fixed fee payment plan, the GUI may provide the consumer with multiple options for payment terms for the fixed fee payment plan. For example, a three month plan option, a six month plan option, and a twelve month plan option may be provided. The GUI may inform the consumer how much the monthly payment and monthly fixed fee would cost for each payment plan. The shorter plans may have less total costs associated with the fixed fees. For example, for a $1,800 fixed fee payment plan, the three month payment plan may comprise a $600 monthly principal payment, plus a $22 monthly fixed fee, for a total cost of $1,866 over the life of the payment plan. A six month fixed fee payment plan may comprise a $300 monthly principal payment, plus a $20 monthly fixed fee, for a total cost of $1,920. A twelve month fixed fee payment plan may comprise a $150 monthly principal payment, plus a $19 monthly fixed fee, for a total cost of $2,028. The different options provide the consumer with the ability to select a payment plan which makes the most sense for the consumer. Although described as having lower monthly fixed fees for longer plans, in various embodiments longer plans may have higher, lower, or equal monthly fixed fees compared to shorter plans. In response to the consumer selecting a payment plan, the amount of the transaction may be removed from the monthly revolving APR balance and placed in a separate payment plan balance.

In various embodiments, the system may transmit a push notification to the consumer's web client in response to the consumer completing a transaction, or in response to the transaction posting with the TAI. In various embodiments, the push notification may ask the consumer if they would like to enter the transaction into a fixed fee payment plan. In various embodiments, the push notification may comprise multiple options for a fixed fee payment plan for the transaction, as shown in FIG. 3.

Figure 4:
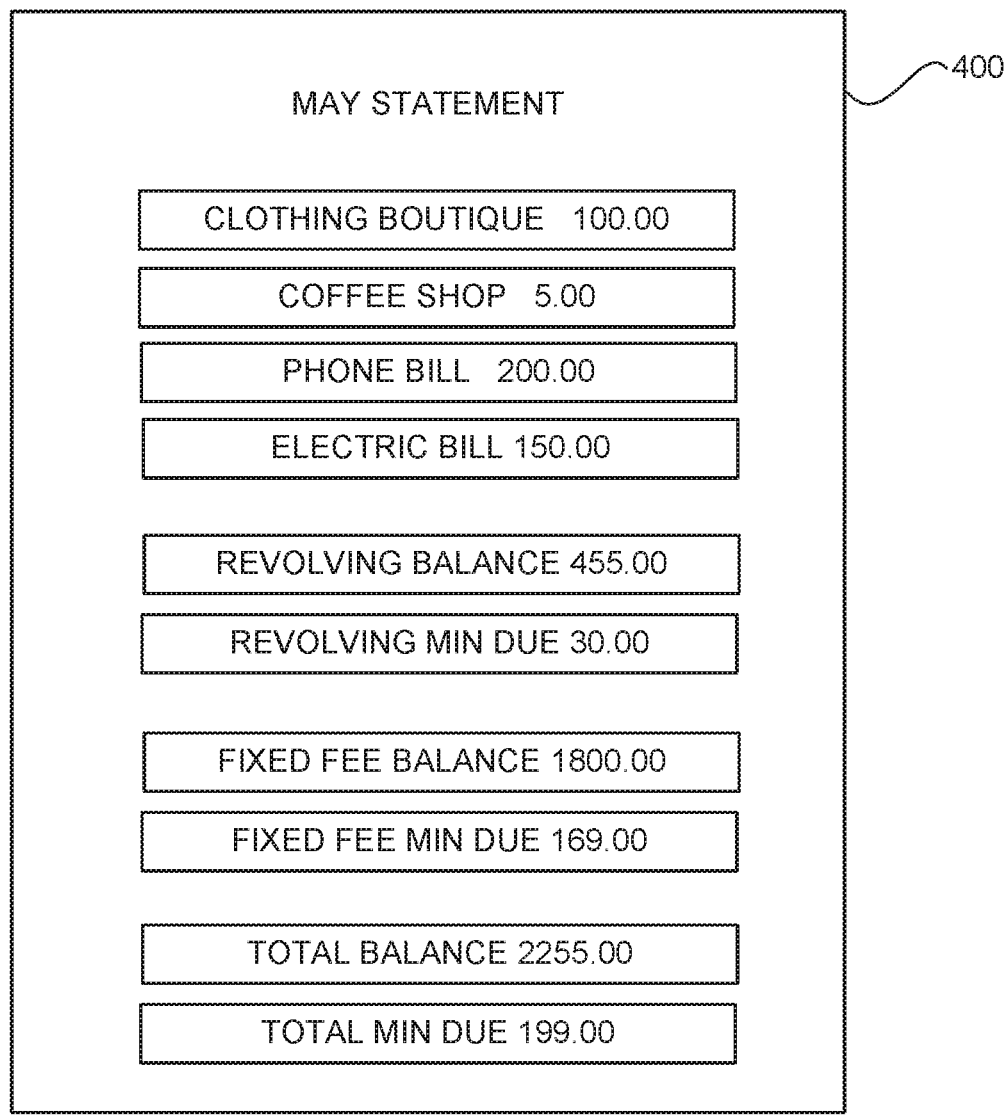
FIG. 4 illustrates an example screenshot of the transaction account including the fixed fee payment plan, in accordance with various embodiments.

Referring to FIG. 4, a screenshot 400 of the transaction account including the fixed fee payment plan is illustrated according to various embodiments. The transaction account may provide a balance and minimum amount due on the revolving APR balance, balance and minimum amount due on the fixed fee payment plan, and a total balance and minimum amount due. The total balance may be the sum of the revolving APR balance and the fixed fee payment plan balance. The total minimum amount due may be the sum of the revolving APR minimum amount due and the fixed fee payment plan minimum amount due. Because the consumer has moved the transaction from the revolving APR balance to the fixed fee payment plan, the minimum amount due on the revolving APR balance may have decreased, but the total minimum amount due may have increased.

Figure 5:
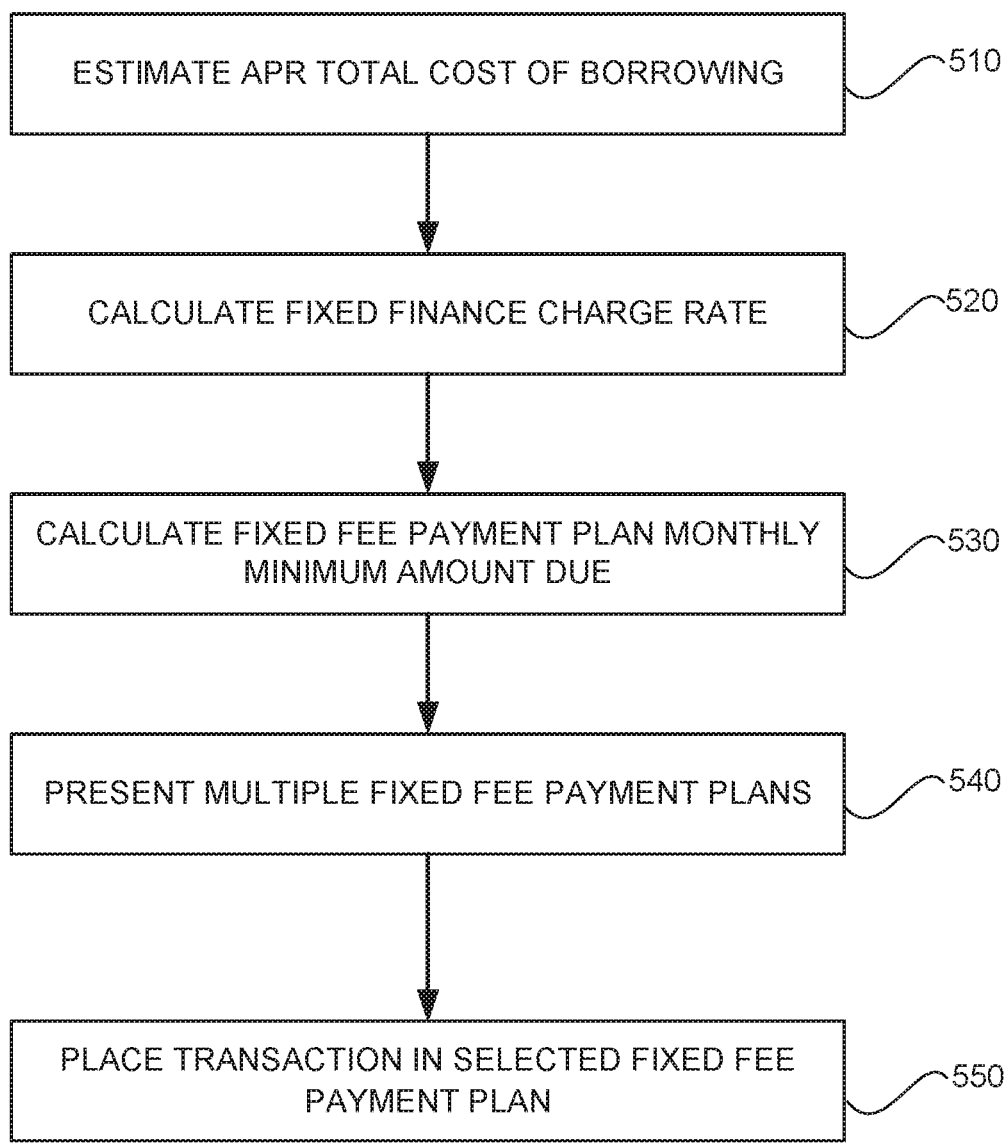
FIG. 5 illustrates a flowchart of a process for calculating a fixed fee payment plan, in accordance with various embodiments.

Referring to FIG. 5, a process for calculating the fee portion of the fixed fee payment plan is illustrated according to various embodiments. The system may estimate an APR total cost of borrowing (step 510). The APR total cost of borrowing may be the amount of interest a consumer would pay for a balance if the balance were subjected to the consumer's APR and the consumer paid off the balance in equal payments over the duration of the fixed fee payment plan. The total cost of borrowing may be calculated as illustrated in Table 1 below:

TABLE 1

| Name | Calculation |
| --- | --- |
| APR Based Beginning Balance ("ABBB") | Month 1: Planned Transaction Amount ("PTA") Subsequent months: prior month's APR Based Ending Balance |
| APR Based Ending Balance | ABBB + APR Based Interest Billed − APR Based Total Payment |
| APR Based Principal Payment | Month 1: PTA/Plan Duration Subsequent: Lesser of Month 1 amount or Remaining Balance |
| APR Based Interest Payment | Prior month's APR Based Interest Billed |
| APR Based Total Payment | APR Based Principal Payment + APR Based Interest Payment |
| Daily Percentage Rate ("DPR") | APR/365 rounded to 6 decimal places |
| Month 1 APR Based Interest Billed | (ABBB − APR Based Total Payment)*((1 + DPR)^(Cycle length − 1) |
| Subsequent APR Based Interest Billed | ABBB*((1 + DPR)^Payment Date − 1) − 1) + (ABBB − APR Based Total Payment + ABBB*((1 + DPR)^(Payment Date − 1) − 1))*((1 + DPR)^(Cycle Length − Payment Date + 1) − 1) |
| Final Month APR Based Interest Billed | ABBB*((1 + DPR)^(Payment Date − 1) − 1) |
| Estimated APR Based Cost of Borrowing | Sum of each month's APR Based Interest Billed |

The system may calculate a fixed finance charge rate based on the Estimated APR Based Cost of Borrowing (step 520). In various embodiments, the system may set the fixed fee cost of borrowing to be equivalent to the APR Based Cost of Borrowing. Thus, the Fixed Finance Charge Rate may be equal to the Estimated APR Based Cost of Borrowing, divided by the plan duration, divided by the Planned Transaction Amount. For example, if the Estimated APR Based Cost of Borrowing were $48.05 for a three month plan duration of a $2,500 purchase, the Fixed Finance Charge Rate may be $48.05/3/$2,500=0.006406. The monthly fixed finance charge amount may then be calculated by multiplying the Fixed Finance Charge Rate by the Planned Transaction Amount: 0.006406*$2,500=$16.01. Thus, different users with different APRs may have different Fixed Finance Charge Rates for fixed fee payment plans of equal beginning balances and durations.

The system may calculate a fixed fee payment plan monthly minimum amount due (step 530). The monthly minimum amount due may be the sum of the Planned Transaction Amount divided by the duration in months, plus the monthly Fixed Finance Charge Amount. The system may calculate a fixed fee payment plan monthly minimum amount due for multiple plan durations. The system may confirm that the total cost of borrowing does not exceed the Estimated APR Based Cost of Borrowing. The system may also calculate a revolving APR minimum amount due. In various embodiments, the revolving APR minimum amount due may be equal to 1% of the revolving APR balance plus an APR finance charge. The APR finance charge may be the accrued interest on the revolving APR balance based on the APR.

The system may present one or more fixed fee payment plans of varying duration to the consumer (step 540). The different options provide the consumer with the ability to select a payment plan which makes the most sense for the consumer. The system may display the duration, monthly minimum amount due, and total cost of borrowing for each fixed fee payment plan. In response to the consumer selecting one of the fixed fee payment plans, the system may remove a selected transaction from a revolving APR balance and place the transaction in the selected fixed fee payment plan (step 550). As long as the consumer pays the monthly minimum amount due, the fixed fee payment plan will be paid off in the selected duration, giving consumers a level of certainty, in contrast to revolving APR balances which may take several years or longer to pay off if only the minimum amount due is paid. In various embodiments, the system may transmit notifications, e.g. on a monthly basis, which notify the consumer of progress in the fixed fee payment plan. For example, the system may inform the consumer whether the consumer is late, ahead, or on schedule with the fixed fee payment plan, and the system may also notify the consumer of any events that altered the status of the fixed fee payment plan.

In various embodiments, the consumer may receive a credit on the transaction account. For example, a merchant may refund a purchase, or the consumer may receive a loyalty credit from the transaction account issuer. In various embodiments, the credit may be larger than the monthly minimum amount due. In such cases, the consumer may not be required to make a payment to the transaction account for that billing period. The fixed fee payment plan may be extended by one month, and no fixed fee finance charge or other interest may be charged to the fixed fee payment plan during that billing period.

In various embodiments, the consumer may place multiple transactions into a single fixed fee plan. The consumer may select the transactions that the consumer would like to place into the fixed fee payment plan. The system may generate options for a fixed fee payment plan in the amount of the sum of the individual transactions selected by the consumer. For example, a consumer may have several purchases related to a trip, such as airfare, hotel, and restaurant charges. The consumer may select all the transactions related to the trip for creation of a single fixed fee payment plan.

In various embodiments, consumers may select to place multiple individual transactions in different fixed fee payment plans. Each time that a consumer creates a new fixed fee plan, the system may determine consumer eligibility and transaction eligibility for the new fixed fee plan. The consumer may provide a name for each fixed fee plan, which may assist the consumer in organization of the fixed fee plans. By providing a plan for paying down transaction account balances, consumers may be encouraged to use transaction accounts for large purchases with the peace of mind of having a plan to pay off balances.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include application servers (e.g. APACHE, IIS, GWS, SUN JAVA® SYSTEM APPLICATION SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of the system to further enhance security.

Firewall may include any hardware and/or software suitably configured to protect system components and/or enterprise computing resources from users of other networks. Further, a firewall may be configured to limit or restrict access to various systems and components behind the firewall for web clients connecting through an application server. Firewall may reside in varying configurations including Stateful Inspection, Proxy based, access control lists, and Packet Filtering among others. Firewall may be integrated within an application server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT application server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache application server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from an application server, the request including a URL and an IP address (123.56.789.234). The application server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In various embodiments, system components may be configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "transaction account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

The system may include or interface with any of the accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

What is claimed is:

1. A method comprising:
  receiving, by an application server of a transaction account issuer, from one or more web client sessions, real-time user-related activity data that is representative of one or more activities performed by a user during a day;
  storing, by the application server of the transaction account issuer, the real-time user-related activity data of the user in a temporary cache user profile data structure of a cache memory storage of the transaction account issuer;
  identifying, by the application server of the transaction account issuer, a time corresponding to a batch processing operation;
  transferring, by the application server of the transaction account issuer, via the batch processing operation, the real-time user-related activity data of the user from the temporary cache user profile data structure of the cache memory storage of the transaction account issuer into a permanent user profile data structure of a datastore of the transaction account issuer to form permanent user profile data of the user;
  receiving, after the time of the batch processing operation and said transferring, and before another batch processing operation, by the application server of the transaction account issuer, additional real-time user-related activity data of the user;
  storing, by the application server of the transaction account issuer, the additional real-time user-related activity data in the temporary cache user profile data structure of the cache memory storage of the transaction account issuer;
  invoking by the application server of the transaction account issuer, upon the receipt and storage of the additional real-time user-related activity data of the user in the cache memory storage of the transaction account issuer, a first application programming interface (API) that is configured to determine user-specific eligibility data of the user, said first API accessing both:
    the additional real-time user-related activity data of the user stored in the temporary cache user profile data structure of the cache memory storage of the transaction account issuer, and
    the permanent user profile data of the user stored in the permanent user profile data structure of the datastore of the transaction account issuer;
  determining, by the first API, that the permanent user profile data indicates that the user is eligible for a maximum monthly payment allowance for fixed activity plans;
  determining, by the first API, fixed activity plans that the permanent user profile data indicates that the user is eligible for under the maximum monthly payment allowance;
  retrieving, by the first API after the batch processing operation, the additional real-time user-related activity data from the temporary cache user profile data structure of the cache memory storage of the transaction account issuer;
  determining, by the first API, that the additional real-time user-related activity data specifies an event corresponding to a first fixed activity plan agreed to by the user after the batch processing operation;
  decreasing, by the first API, the maximum monthly payment allowance for the fixed activity plans based at least in part on the event specified in the additional real-time user-related activity data;
  determining, in real-time by the first API, that the user is eligible for a second fixed activity plan under the decreased maximum monthly payment allowance, wherein the fixed activity plans indicated by the permanent user profile data comprise the second fixed activity plan;
  invoking, in real-time, by the application server of the transaction account issuer, upon the determination of the second fixed activity plan, a second API that is configured to generate the second fixed activity plan;
  causing, in real-time, by the application server of the transaction account issuer, the second fixed activity plan to be displayed on a screen of a computing device associated with the user;
  receiving, in real-time, by the application server of the transaction account issuer, from the computing device, a response from the user selecting the second fixed activity plan;
  receiving, in real-time, by the application server of the transaction account issuer, real-time activity performance data representative of at least one activity performance of the user; and
  invoking, in real-time, by the application server of the transaction account issuer, upon the receipt of the real-time activity performance data representative of the at least one activity performance of the user, a third API that is configured to attribute, in real-time, the at least one activity performance of the user to the second fixed activity plan based at least in part on at least one pre-determined allocating rule.

2. The method of claim 1, wherein the second fixed activity plan is a fixed fee payment plan and the method further comprises:
  estimating, in real-time, by the application server of the transaction account issuer, an APR total cost for the fixed fee payment plan;
  calculating, in real-time, by the application server of the transaction account issuer, based at least in part on the estimated APR total cost, a fixed finance charge rate;
  calculating, in real-time, by the application server of the transaction account issuer, based at least in part on the fixed finance charge rate, a fixed finance charge amount; and
  communicating, in real-time, by the application server of the transaction account issuer to the computing device associated with the user, software instructions for displaying a graphical user interface (GUI), the GUI comprising a display of the fixed finance charge amount in association with the fixed fee payment plan.

3. The method of claim 2, further comprising:
calculating, in real-time, by the application server of the transaction account issuer, a monthly fixed fee minimum amount due based at least in part on an amount of the fixed fee payment plan and a number of months of the fixed fee payment plan.

4. The method of claim 2, further comprising:
calculating, in real-time, by the application server of the transaction account issuer, a minimum amount due for a transaction account of the user based at least in part on a revolving APR minimum amount due and a fixed fee minimum amount due; and
communicating, in real-time, by the application server of the transaction account issuer to the computing device associated with the user, software instructions for displaying a graphical user interface (GUI), the GUI comprising a display of the minimum amount due for the transaction account in association with the fixed fee payment plan.

5. The method of claim 2, further comprising:
calculating, in real-time, by the application server of the transaction account issuer, a fixed fee minimum amount due;
receiving, in real-time, by the application server of the transaction account issuer, a payment to a transaction account of the user, wherein the payment is equal to or greater than a sum of a revolving APR balance and the fixed fee minimum amount due; and
revolving, in real-time, by the application server of the transaction account issuer, a remaining balance of the transaction account without charging an APR finance charge to the transaction account.

6. The method of claim 5, further comprising:
charging, in real-time, by the application server of the transaction account issuer, a fixed fee finance charge in a statement period after a current statement period; and
exempting, in real-time, by the application server of the transaction account issuer, a new transaction from the APR finance charge.

7. The method of claim 2, further comprising:
determining, in real-time, by the application server of the transaction account issuer, a duration for the fixed fee payment plan, the duration comprising intervals corresponding to a frequency of transactions.

8. The method of claim 1, further comprising determining, by a fourth API, whether a transaction of the user is eligible for the second fixed activity plan.

9. A system comprising:
at least one application server of a transaction account issuer;
at least one cache memory storage of the transaction account issuer;
a datastore of the transaction account issuer; and
wherein the at least one application server of the transaction account issuer is at least configured to:
receive, from one or more web client sessions, real-time user-related activity data that is representative of one or more activities performed by a user during a day;
store the real-time user-related activity data of the user in a temporary cache user profile data structure of the at least one cache memory storage of the transaction account issuer;
identify a time corresponding to a batch processing operation;
transfer, via the batch processing operation, the real-time user-related activity data of the user from the temporary cache user profile data structure of the at least one cache memory storage of the transaction account issuer into a permanent user profile data structure of a datastore of the transaction account issuer to form permanent user profile data of the user;
receive, after the time of the batch processing operation and said transferring, and before another batch processing operation, additional real-time user-related activity data of the user;
store the additional real-time user-related activity data in the temporary cache user profile data structure of the cache memory storage of the transaction account issuer;
invoke upon the receipt of the real-time user-related activity data of the user, a first application programming interface (API) that is configured to determine user-specific eligibility data of the user, the first API accessing both: the additional real-time user-related activity data of the user stored in the temporary cache user profile data structure of the at least one cache memory storage of the transaction account issuer, and the permanent user profile data of the user stored in the permanent user profile data structure of the datastore of the transaction account issuer;
determine, by the first API, that the permanent user profile data indicates that the user is eligible for a maximum monthly payment allowance for fixed activity plans;
determine, by the first API, fixed activity plans that the permanent user profile data indicates that the user is eligible for under the maximum monthly payment allowance;
retrieve, by the first API after the batch processing operation, the additional real-time user-related activity data from the temporary cache user profile data structure of the cache memory storage of the transaction account issuer,
determine, by the first API, that the additional real-time user-related activity data specifies an event corresponding to a first fixed activity plan agreed to by the user after the batch processing operation;
decrease, by the first API, the maximum monthly payment allowance for the fixed activity plans based at least in part on the event specified in the additional real-time user-related activity data;
determining, in real-time by the first API, that the user is eligible for a second fixed activity plan under the decreased maximum monthly payment allowance, wherein the fixed activity plans indicated by the permanent user profile data comprise the second fixed activity plan;
invoke, in real-time, upon the determination of a second fixed activity plan, a second API that is configured to generate the second fixed activity plan;
cause, in real-time, the second fixed activity plan to be displayed on a screen of a computing device associated with the user;
receive, in real-time, from the computing device, a response from the user selecting the second fixed activity plan;
receive, in real-time, real-time activity performance data representative of at least one activity performance of the user; and
invoke, in real-time, upon the receipt of the real-time activity performance data representative of the at least one activity performance of the user, a third API that is configured to attribute, in real-time, the at least one activity performance of the user to the second fixed activity plan based at least in part on at least one pre-determined allocating rule.

10. The system of claim 9, wherein the second fixed activity plan is a fixed fee payment plan and wherein the at least one application server of the transaction account issuer is further configured to:
estimate an APR total cost for the fixed fee payment plan;
calculate, based at least in part on the estimated APR total cost, a fixed finance charge rate;
calculate, based at least in part on the fixed finance charge rate, a fixed finance charge amount; and
communicate software instructions for displaying a graphical user interface (GUI), the GUI comprising a display of the fixed finance charge amount in association with the fixed fee payment plan.

11. The system of claim 10, wherein the at least one application server of the transaction account issuer is further configured to:
calculate a monthly fixed fee minimum amount due based at least in part on an amount of the fixed fee payment plan and a number of months of the fixed fee payment plan.

12. The system of claim 10, wherein the at least one application server of the transaction account issuer is further configured to:
calculate a minimum amount due for a transaction account of the user based at least in part on a revolving APR minimum amount due and a fixed fee minimum amount due; and
generate a graphical user interface (GUI), the GUI comprising a display of the minimum amount due for the transaction account in association with the fixed fee payment plan.

13. The system of claim 10, wherein the at least one application server of the transaction account issuer is further configured to:
calculate a fixed fee minimum amount due;
receive a payment to a transaction account of the user, wherein the payment is equal to or greater than a sum of a revolving APR balance and the fixed fee minimum amount due;
revolve a remaining balance of the transaction account without charging an APR finance charge to the transaction account;
charge a fixed fee finance charge in a statement period after a current statement period; and
exempt a new transaction from the APR finance charge.

14. The system of claim 9, wherein the at least one application server is further configured to at least determine, by a fourth API, whether a transaction of the user is eligible for the second fixed activity plan.

15. A non-transitory computer readable storage medium storing software thereon, the software comprising instructions configured to cause at least one processor of at least one computer to perform steps comprising:
receiving, from one or more web client sessions, real-time user-related activity data that is representative of one or more activities performed by a user during a day;
storing the real-time user-related activity data of the user in a temporary cache user profile data structure of a cache memory storage of a transaction account issuer;
identifying a time corresponding to a batch processing operation;
transferring, via the batch processing operation, the real-time user-related activity data of the user from the temporary cache user profile data structure of the cache memory storage of the transaction account issuer into a permanent user profile data structure of a datastore of the transaction account issuer to form permanent user profile data of the user;
receiving, after the time of the batch processing operation and said transferring, and before another batch processing operation, additional real-time user-related activity data of the user;
storing the additional real-time user-related activity data in the temporary cache user profile data structure of the cache memory storage of the transaction account issuer;
invoking upon the receipt of the real-time user-related activity data of the user, a first application programming interface (API) that is configured to determine user-specific eligibility data of the user, the first API based at least in part on accessing both:
the additional real-time user-related activity data of the user stored in the temporary cache user profile data structure of the cache memory storage of the transaction account issuer, and
the permanent user profile data of the user stored in the permanent user profile data structure of the datastore of the transaction account issuer;
determining, by the first API, that the permanent user profile data indicates that the user is eligible for a maximum monthly payment allowance for fixed activity plans;
determining, by the first API, fixed activity plans that the permanent user profile data indicates that the user is eligible for under the maximum monthly payment allowance;
retrieving, by the first API after the batch processing operation, the additional real-time user-related activity data from the temporary cache user profile data structure of the cache memory storage of the transaction account issuer,
determining, by the first API, that the additional real-time user-related activity data specifies an event corresponding to a first fixed activity plan agreed to by the user after of the batch processing operation;
decreasing, by the first API, the maximum monthly payment allowance for the fixed activity plans based at least in part on the event specified in the additional real-time user-related activity data;
determining, in real-time by the first API, that the user is eligible fora second fixed activity plan under the decreased maximum monthly payment allowance, wherein the fixed activity plans indicated by the permanent user profile data comprise the second fixed activity plan;
invoking, in real-time, upon the determination of the second fixed activity plan, a second API that is configured to generate the second fixed activity plan;
causing, in real-time, the second fixed activity plan to be displayed on a screen of a computing device associated with the user;
receiving, in real-time, from the computing device, a response from the user selecting the second fixed activity plan;
receiving, in real-time, real-time activity performance data representative of at least one activity performance of the user; and
invoking, in real-time, upon the receipt of the real-time activity performance data representative of the at least one activity performance of the user, a third API that is configured to attribute, in real-time, the at least one activity performance of the user to the second fixed activity plan based at least in part on at least one pre-determined allocating rule.

16. The non-transitory computer readable storage medium of claim 15, wherein the second fixed activity plan is a fixed fee payment plan and wherein the instructions are further configured to cause the at least one processor of the at least one computer to perform steps, comprising:
estimating an APR total cost for the fixed fee payment plan;
calculating, based at least in part on the estimated APR total cost, a fixed finance charge rate;
calculating, based at least in part on the fixed finance charge rate, a fixed finance charge amount; and
generating a graphical user interface (GUI), the GUI comprising a display of the fixed finance charge amount in association with the fixed fee payment plan.

17. The non-transitory computer readable storage medium of claim 16, wherein the instructions are further configured to cause the at least one processor of the at least one computer to perform steps, comprising:
calculating a monthly fixed fee minimum amount due, wherein the monthly fixed fee minimum amount due comprises: an amount of the fixed fee payment plan divided by a number of months of the fixed fee payment plan.

18. The non-transitory computer readable storage medium of claim 16, wherein the instructions are further configured to cause the at least one processor of the at least one computer to perform steps comprising:
calculating a minimum amount due for a transaction account of the user based at least in part on a revolving APR minimum amount due and a fixed fee minimum amount due; and
generating a graphical user interface (GUI), the GUI comprising a display of the minimum amount due for the transaction account in association with the fixed fee payment plan.

19. The non-transitory computer readable storage medium of claim 16, wherein the instructions are further configured to cause the at least one processor of the at least one computer to perform steps comprising:
calculating a fixed fee minimum amount due;
receiving a payment to a transaction account of the user, wherein the payment is equal to or greater than a sum of a revolving APR balance and the fixed fee minimum amount due;
revolving a remaining balance of the transaction account without charging an APR finance charge to the transaction account;
charging a fixed fee finance charge in a statement period after a current statement period; and
exempting a new transaction from the APR finance charge.

20. The non-transitory computer readable storage medium of claim 15, wherein the instructions are further configured to cause the at least one processor of the at least one computer to perform steps, comprising:
determining, by a fourth API, whether a transaction of the user is eligible for the second fixed activity plan.

* * * * *